United States Patent
Kang

(10) Patent No.: US 10,777,803 B2
(45) Date of Patent: Sep. 15, 2020

(54) SECONDARY BATTERY

(71) Applicant: Samsung SDI Co., Ltd., Yongin-si, Gyeonggi-do (KR)

(72) Inventor: Minjung Kang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 319 days.

(21) Appl. No.: 15/331,723

(22) Filed: Oct. 21, 2016

(65) Prior Publication Data
US 2017/0117529 A1    Apr. 27, 2017

(30) Foreign Application Priority Data

Oct. 23, 2015 (KR) .................. 10-2015-0148021

(51) Int. Cl.
| | |
|---|---|
| *H01M 10/6553* | (2014.01) |
| *H01M 10/655* | (2014.01) |
| *H01M 10/04* | (2006.01) |
| *H01M 2/02* | (2006.01) |
| *H01M 2/26* | (2006.01) |
| *H01M 2/06* | (2006.01) |

(52) U.S. Cl.
CPC ......... *H01M 2/263* (2013.01); *H01M 2/0275* (2013.01); *H01M 2/06* (2013.01); *H01M 10/0431* (2013.01); *H01M 10/6553* (2015.04)

(58) Field of Classification Search
None
See application file for complete search history.

(56) References Cited

U.S. PATENT DOCUMENTS

| | | | |
|---|---|---|---|
| 8,632,913 B2 | 1/2014 | Han | |
| 2004/0038125 A1* | 2/2004 | Kim | ............... H01M 2/021 |
| | | | 429/162 |
| 2011/0064992 A1* | 3/2011 | Kim | ............... H01M 2/1016 |
| | | | 429/153 |
| 2016/0049632 A1 | 2/2016 | Hwang et al. | |

FOREIGN PATENT DOCUMENTS

| | | | | |
|---|---|---|---|---|
| JP | 1202371 | * | 2/2002 | ............... H01M 10/40 |
| KR | 10-2012-0008316 A | | 1/2012 | |
| KR | 10-2014-0032712 A | | 3/2014 | |
| KR | 10-2016-0020899 A | | 2/2016 | |

* cited by examiner

*Primary Examiner* — Yoshitoshi Takeuchi
(74) *Attorney, Agent, or Firm* — Knobbe, Martens, Olson & Bear, LLP

(57) ABSTRACT

A secondary battery is disclosed. In one aspect, the secondary battery includes an electrode assembly having a top space, a first main surface and a second main surface opposing each other. The secondary battery also includes an electrode tab extending outwardly from the top surface of the electrode assembly so as to channel heat away from the electrode assembly. The secondary battery further includes a fixing member formed adjacent to the electrode tab and covering at least the top surface of the electrode assembly so as to reduce a thermal deformation of the electrode assembly caused by the heat from the electrode tab.

21 Claims, 5 Drawing Sheets

SECONDARY BATTERY

CROSS-REFERENCE TO RELATED APPLICATION

This application claims the benefit of Korean Patent Application No. 10-2015-0148021, filed on Oct. 23, 2015, in the Korean Intellectual Property Office, the disclosure of which is incorporated herein in its entirety by reference.

BACKGROUND

Field

The described technology generally relates to a rechargeable secondary battery.

Description of the Related Technology

With technological advances in mobile devices such as cell phones and laptop computers and increased production yields, demand for secondary batteries has rapidly increased. Recently, research and development in secondary batteries has been actively conducted for use as alternative energy sources that replace fossil fuels as energy sources for electric vehicles or hybrid vehicles.

Secondary batteries generate a large amount of heat during operation and are exposed to external heat during welding when they are manufactured. Electrical properties of secondary batteries change according to thermal deformation or swelling, and thus, their output performance will degrade over time.

SUMMARY OF CERTAIN INVENTIVE ASPECTS

One inventive aspect relates to a secondary battery that can prevent or minimize a thermal deformation or swelling while being welded or operating.

Another aspect is a secondary battery that can improve assembly due to modularity of components of the secondary battery.

Another aspect is a secondary battery of which electrode tabs are easily handled in a multi-tab structure including multiple electrode tabs.

Another aspect is a secondary battery that includes: an electrode assembly; an electrode tab projected from the electrode assembly; and a fixing member formed around the electrode tab of the electrode assembly and surrounding the electrode assembly in a projection direction of the electrode tab.

The electrode assembly may include first and second main surfaces facing each other, and the fixing member may extend from the first main surface toward the second main surface across an upper surface of the electrode assembly from which the electrode tab is projected.

The secondary battery may further include an insulating spacer arranged on an upper surface of the electrode assembly from which the electrode tab is projected, wherein the fixing member may surround the electrode assembly together with the insulating spacer.

The insulating spacer may include a tab hole in which the electrode tab is inserted.

The electrode assembly may include first and second main surfaces facing each other, and the fixing member may extend from the first main surface of the electrode assembly toward the second main surface of the electrode assembly across the insulating spacer.

The insulating spacer may include a mounting groove formed along a trace of the fixing member.

The mounting groove may be formed across an upper surface and side surfaces of the insulating spacer.

Walls of the upper surface and side surfaces of the insulating spacer defining the mounting groove may include round edges, the walls located around the mounting groove.

The mounting groove may include a round mounting part contacting the fixing member.

A border of the insulating spacer may include round edges.

The electrode tab may include first and second electrode tabs having different polarities, and the fixing member may be arranged on an outer side of the first electrode tab, on an outer side of the second electrode tab, or between the first and second electrode tabs.

The electrode tab may include first and second electrode tabs having different polarities, and the fixing member may include: a first fixing member arranged on an outer side of the first electrode tab; a second fixing member arranged on an outer side of the second electrode tab; and a third fixing member arranged between the first and second electrode tabs.

The first to third fixing members may be arranged in parallel along the projection direction of the electrode tab.

A width of the third fixing member may be greater than widths of the first and second fixing members.

The fixing member may include an adhesive tape.

The fixing member may include polyimide.

The secondary battery may further include a case for housing the electrode assembly, wherein the case may include a flexible pouch.

The electrode tab may include electrode tabs having a same polarity.

Another aspect is a secondary battery comprising: an electrode assembly having a top space, a first main surface and a second main surface opposing each other; an electrode tab extending outwardly from the top surface of the electrode assembly so as to channel heat away from the electrode assembly; and a fixing member formed adjacent to the electrode tab and covering at least the top surface of the electrode assembly so as to reduce a thermal deformation of the electrode assembly caused by the heat from the electrode tab.

In the above secondary battery, the fixing member extends from the first main surface of the electrode assembly toward the second main surface of the electrode assembly across the top surface of the electrode assembly. The above secondary battery further comprises an insulating spacer at least a portion of which is interposed between the top surface of the electrode assembly and the fixing member. In the above secondary battery, the insulating spacer has a tab hole into which the electrode tab is inserted. In the above secondary battery, the fixing member extends from the first main surface of the electrode assembly toward the second main surface of the electrode assembly across the insulating spacer.

In the above secondary battery, the insulating spacer comprises a mounting groove configured to receive a portion of the fixing member. In the above secondary battery, the width of the mounting groove is the same as the width of the portion of the fixing member. In the above secondary battery, the mounting groove is formed across an upper surface and side surfaces of the insulating spacer. In the above secondary battery, walls of the upper surface and side surfaces of the insulating spacer defining the mounting groove comprise round edges, and wherein the walls are located around the mounting groove. In the above secondary battery, the mounting groove comprises a round mounting portion contacting the fixing member.

In the above secondary battery, the insulating spacer comprises at least one round edge. In the above secondary battery, the electrode tab comprises first and second electrode tabs having different polarities, and wherein the fixing member is arranged on an outer side of the first electrode tab, on an outer side of the second electrode tab, or between the first and second electrode tabs. In the above secondary battery, the electrode tab comprises first and second electrode tabs having different polarities, and wherein the fixing member comprises: a first fixing member arranged on an outer side of the first electrode tab; a second fixing member arranged on an outer side of the second electrode tab; and a third fixing member arranged between the first and second electrode tabs.

In the above secondary battery, the first to third fixing members are arranged in parallel. In the above secondary battery, the width of the third fixing member is greater than a combined width of the first and second fixing members. In the above secondary battery, the fixing member comprises an adhesive tape or polyimide. The above secondary battery further comprises a case accommodating the electrode assembly, wherein the case comprises a flexible pouch. In the above secondary battery, the electrode tab comprises a plurality of electrode tabs having the same polarity.

Another aspect is a secondary battery comprising: an electrode assembly having a top space, a first main surface and a second main surface opposing each other; an electrode tab outwardly extending from the top surface of the electrode assembly; a fixer formed adjacent to the electrode tab and covering the top, first and second main surfaces of the electrode assembly; and an insulating spacer at least a portion of which is interposed between the top surface of the electrode assembly and the fixer.

In the above secondary battery, the electrode tab comprises first and second electrode tabs having different polarities, wherein the fixer comprises first, second and third fixers, wherein the first electrode tab is positioned between the first and third fixers, and wherein the second electrode tab is positioned between the second and third fixers.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Embodiments will now be described more fully with reference to the accompanying drawings. In this disclosure, the term "substantially" includes the meanings of completely, almost completely or to any significant degree under some applications and in accordance with those skilled in the art. Moreover, "formed, disposed over positioned over" can also mean "formed, disposed or positioned on." The term "connected" includes an electrical connection.

Figure 1:
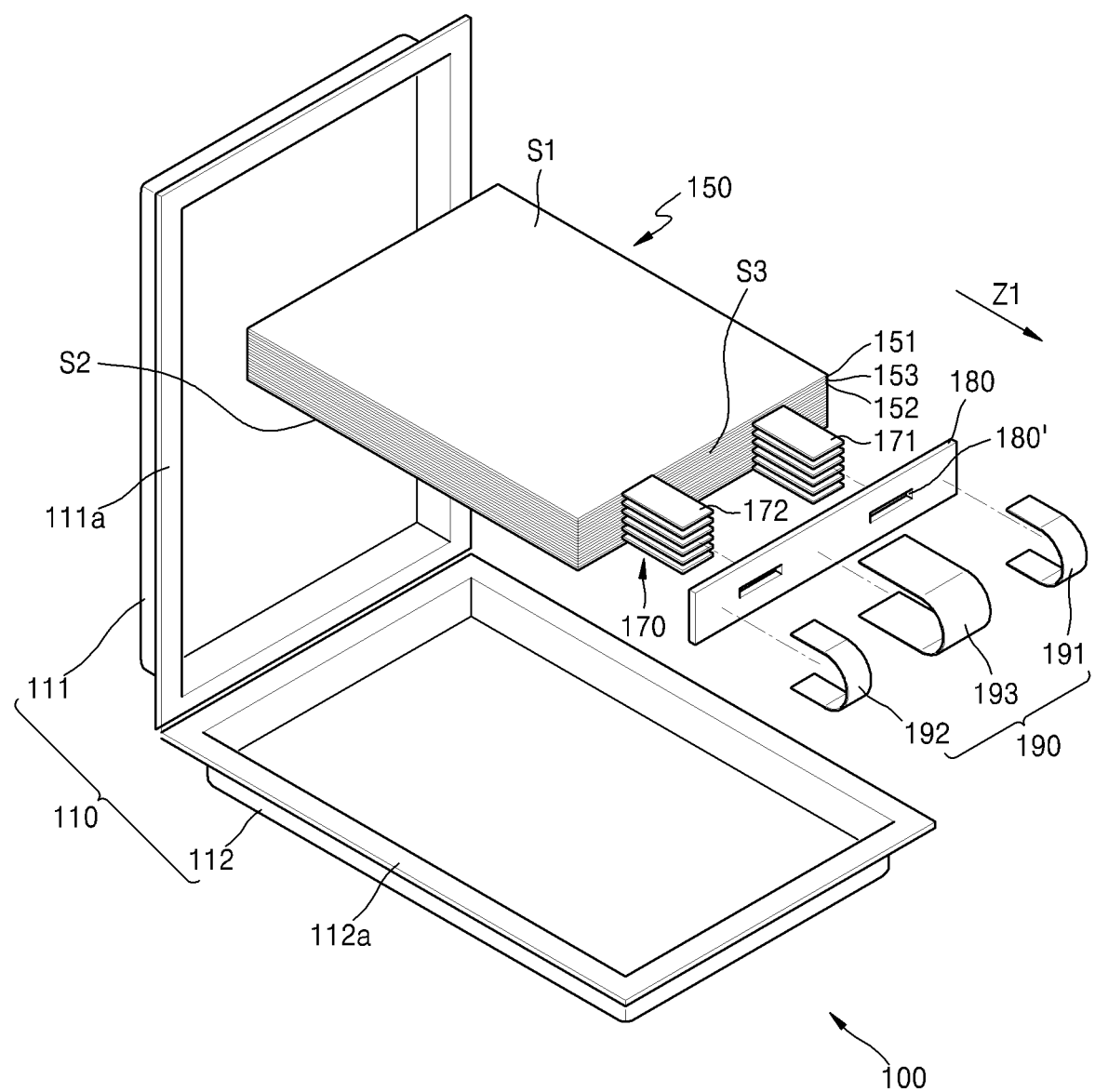
FIG. 1 is an exploded perspective view of a secondary battery according to an exemplary embodiment.
Figure 2:
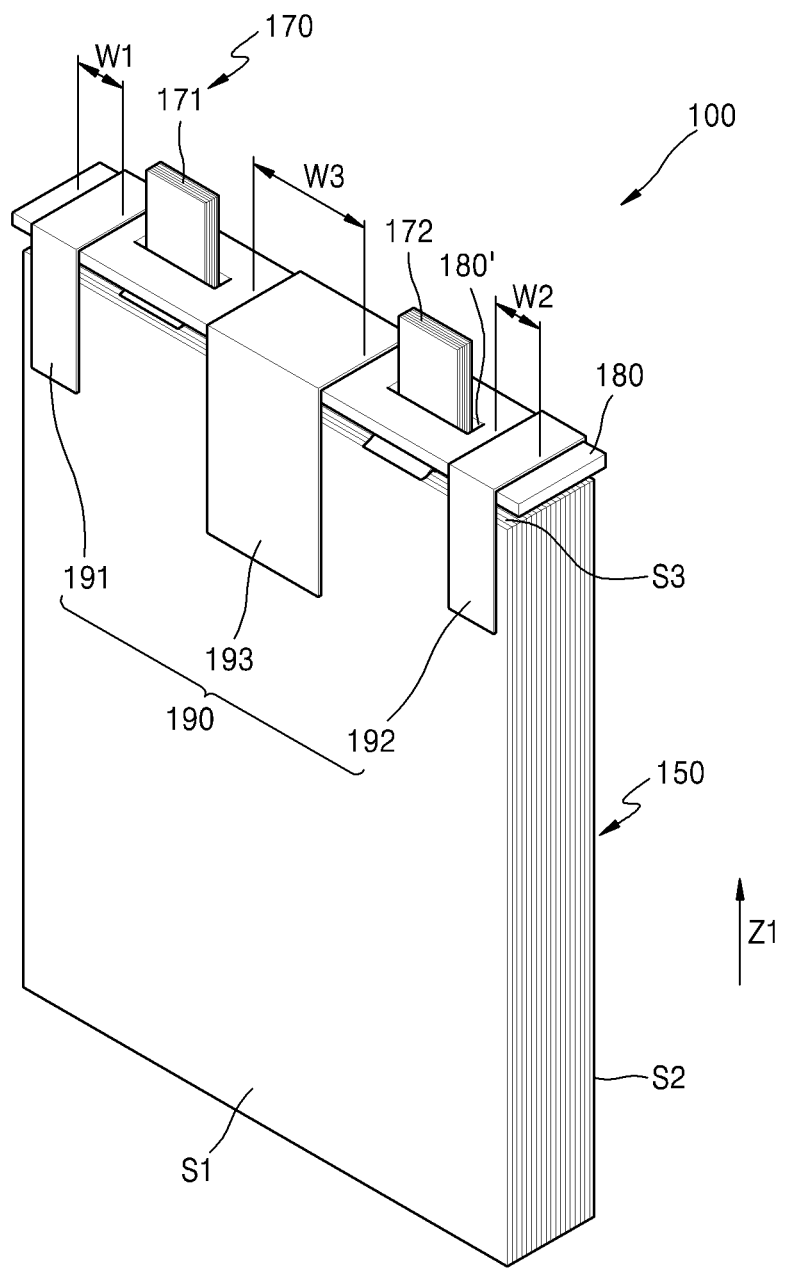
FIG. 2 is a perspective view of a portion of FIG. 1.
Figure 3:
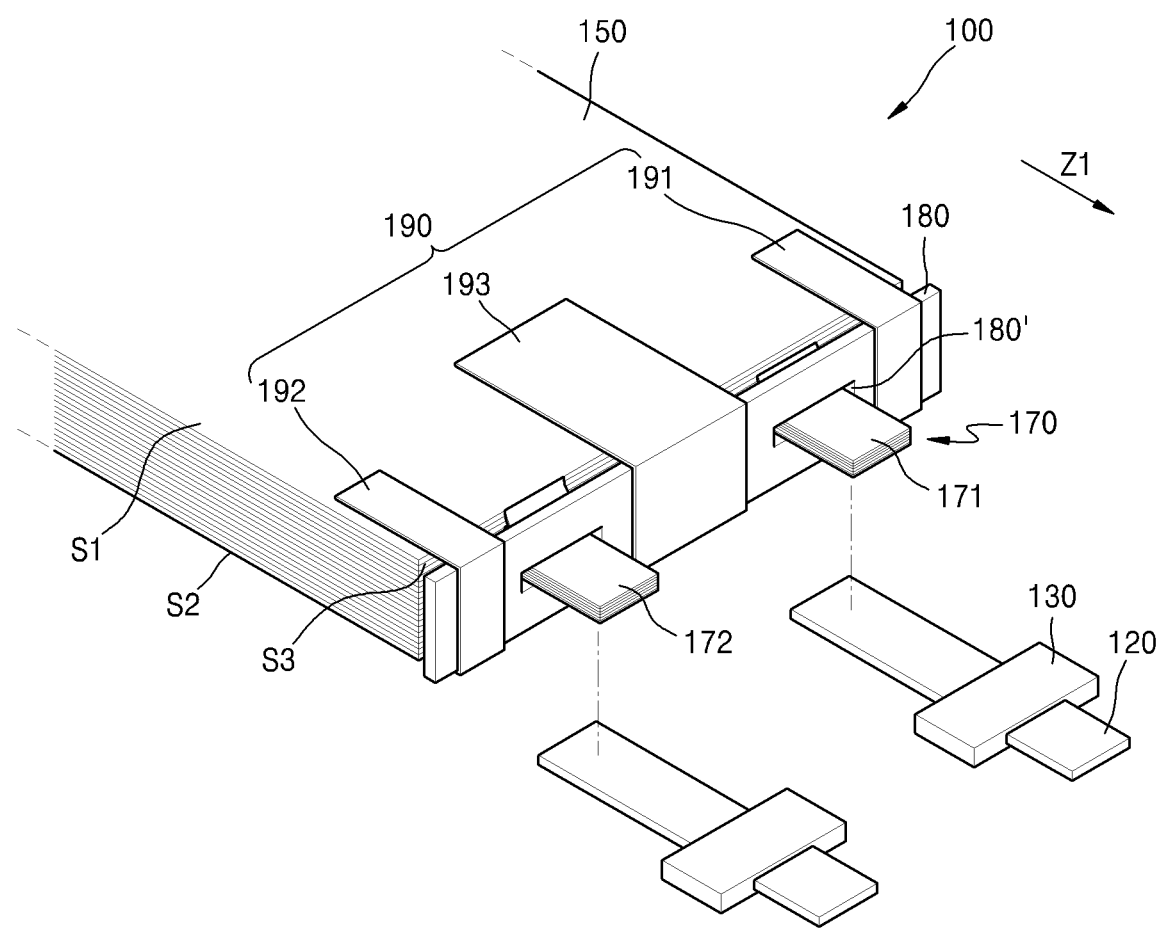
FIG. 3 is a diagram illustrating a welding state of an electrode tab of FIG. 1.

FIG. 1 is an exploded perspective view of a secondary battery 100 according to an exemplary embodiment. FIG. 2 is a perspective view of a portion of FIG. 1. FIG. 3 is a diagram illustrating a welding state of an electrode tab of FIG. 1.

Referring to drawings, the secondary battery 100 includes an electrode assembly 150, an electrode tab 170 outwardly extending from the electrode assembly 150, and fixing members or fixers 190 arranged around the electrode tab 170 of the electrode assembly 150 and surrounding the electrode assembly 150 in a projection direction Z1 of the electrode tab 170.

The electrode assembly 150 includes a separator 153 between first and second electrode plates 151 and 152 having different polarities. In some embodiments, the electrode assembly 150 is of a jelly-roll type in which the separator 153 is inserted between the first and second electrode plates 151 and 152 and then rolled. In another exemplary embodiment, the electrode assembly 150 is of a stack type in which separators 153 are stacked between the first and second electrode plates 151 and 152 that are of a sheet type.

The electrode assembly 150 is used to form charge and discharge paths and may include the electrode tab 170 projected therefrom. The electrode tab 170 includes first and second electrode tabs 171 and 172 electrically connected to the first and second electrode plates 151 and 152.

The electrode assembly 150 is housed in a case 110. The case 110 includes first and second cases 111 and 112 including the electrode assembly 150 therebetween and coupled to face each other. Sealing parts 111a and 112a are formed along edges of the first and second cases 111 and 112 and contact each other. For example, the first and second cases 111 and 112 housing the electrode assembly 150 are coupled to face each other, and through thermal bonding of the sealing parts 111a and 112a, the electrode assembly 150 may be sealed.

The case 110 may include a flexible pouch. For example, the case 110 is an exterior material including insulating resin layers (not shown) formed on both sides of a metallic thin plate (not shown) and may be of a pouch type in which the electrode assembly 150 is sealed.

In some embodiments, as shown in FIG. 3, the first and second electrode plates 151 and 152 are welded to a lead member 120 via first and second electrode tabs 171 and 172. The first and second electrode plates 151 and 152 are used to form charge and discharge paths and may be welded to the lead member 20 projected outside the case 110.

A sealing member 130 may be formed on the lead member 120. For example, the sealing member 130 is formed at a location where the sealing member 130 contacts the case 110 and is electrically insulated from the case 110, thereby sealing a gap between the lead member 120 and the case 110.

The fixing member 190 is formed over the electrode assembly 150 and surrounds the same. The fixing member 190 may surround the electrode assembly 150 in the projection direction Z1 of the electrode tab 170 of the electrode assembly 150. For example, the fixing member 190 may be formed along the projection direction Z1 of the electrode tab 170.

The electrode assembly 150 may include first and second main surfaces S1 and S2 facing each other. In this case, the fixing member 190 may extend from the first main surface S1 toward the second main surface S2 across an upper surface or top surface S3 from which the electrode tab 170 is projected. As described below, the fixing member 190 may prevent a thermal deformation of the electrode assembly 150 by surrounding the electrode tab 170 of the electrode assembly 150.

The electrode tab 170 for forming a current path of the electrode assembly 150 may produce a larger amount of heat due to concentration of a current and resistance heat generated by the concentration of current. Accordingly, thermal contraction of the separator 153 may occur due to the concentration of the heat around the electrode tab 170 of the electrode assembly 150, or an internal short circuit may occur due to the thermal contraction. Gaps may be formed in the wrinkled electrode assembly 150 or swelling of the electrode assembly 150 may occur due to the thermal deformation of the separator 153. A thermal deformation of the electrode assembly 150 may change electrical properties of the secondary battery and may lead to degradation of output performance.

In an exemplary embodiment, the fixing member 190 surrounding the electrode tab 170 is formed on the electrode assembly 150 along the projection direction Z1 of the electrode tab 170 and may control thermal contraction of the separator 153 or generation of wrinkle by pressing the electrode assembly 150 in a thickness direction of the electrode assembly 150. Thus, the thermal deformation or swelling of the electrode assembly 150 may be prevented. For example, the fixing member 190 may have a band shape to which tensile stress is applied along an extension direction of the fixing member 190. In this case, the tensile stress is applied to the fixing member 190 such that a gap between an end of the fixing member 190 and the other end thereof may remain uniform. Thus, generation of gaps in the electrode assembly 150 or swelling of the electrode assembly 150 may be prevented.

The fixing member 190 may include an adhesive tape formed of an insulating material. For example, the fixing member 190 has an end and the other end that respectively adhere to the first and second main surfaces S1 and S2 of the electrode assembly 150 and may prevent the electrode assembly 150 from having a gap by applying the tensile stress between the end and the other end of the fixing member 190.

The fixing member 190 may include first to third fixing members 191, 192, and 193. For example, the fixing member 190 may include a first fixing member 191 arranged on an outer side of a first electrode tab 171, a second fixing member 192 arranged on an outer side of a second electrode tab 172, and a third fixing member 193 arranged between the first and second electrode tabs 171 and 172. The first to third fixing members 191, 192, and 193 may extend in substantially parallel along the projection direction Z1 of the electrode tab 170.

Since heat may be concentrated between the first and second electrode tabs 171 and 172, a width W3 of the third fixing member 193 may be greater than a combined width of W1 and W2 of the first and second fixing members 191 and 192 (see FIG. 2). Widths of the fixing members 190 may differ according to a degree of a thermal deformation. However, depending on the embodiment, the width W3 of the third fixing member 193 can be the same as or less than each of the widths W1 and W2 of the first and second fixing members.

The fixing member 190 may be formed of an adhesive tape. As described below, the fixing member 190 may extend from the first main surface S1 of the electrode assembly 150 toward the second main surface S2 thereof across the insulating spacer 180 formed on the upper surface S3 of the electrode assembly 150 and may adhere to external surfaces of the electrode assembly 150 and insulating spacer 180.

The fixing member 190 is formed around the electrode tab 170 and may have a thermal resistance property such that the fixing member 190 may not be stretched even though the electrode tab 170 produces heat. For example, the fixing member 190 may include thermosetting resin or high thermal resistance resin. In more detail, the fixing member 190 may include polyimide.

As described below, the fixing member 190 surrounds the electrode assembly 150 and the insulating spacer 180 and may have a small thickness in order not to increase an external size of the entire secondary battery. For example, the fixing member 190 may have a thickness of less than about 1 mm.

The fixing member 190 may surround the electrode tab 170 of the electrode assembly 150. The fixing member 190 fixes the insulating spacer 180. For example, the fixing member 190 fixes the insulating spacer 180 onto the electrode assembly 150 by surrounding the insulating spacer 180 as well as the electrode assembly 150.

The fixing member 190 may extend from the first main surface S1 of the electrode assembly 150 toward the second main surface S2 thereof across the insulating spacer 180 on the upper surface S3 of the electrode assembly 150. The fixing member 190 may fix the insulating spacer 180 onto the electrode assembly 150 and combine the same into one component during assembly of the secondary battery to thereby improve convenience of the assembly.

The insulating spacer 180 may include a tab hole 180' for holding the electrode tab 170. The fixing member 190 may hold the electrode tab 170 by fixing the insulating spacer 180 and may prevent damage of the electrode tab 170. The insulating spacer 180 may designate a location of the electrode tab 170 and may prevent the electrode tab 170 from freely moving by fixing the location of the insulating spacer 180 during the assembly of the secondary battery, and thus, the damage of the electrode tab 170 may be prevented.

The secondary battery may have a multi-tab structure including electrode tabs 170. The electrode assembly 150 may include the electrode tabs 170, and the electrode tabs 170 may be bounded in one unit by passing through the tab hole 180' of the insulating spacer 180. Accordingly, the electrode tab 170 may be easily handled. The electrode assembly 150 including the electrode tabs 170 may indicate that there are first electrode tabs 171 having the same polarity and second electrode tabs 172 having the same polarity.

The electrode tabs 170 may be bounded in one unit through the tab hole 180' of the insulating spacer 180, and the bounded electrode tab 170 may be welded to the lead member 120. The insulating spacer 180 applied to the multi-tab structure may improve welding workability between the electrode tabs 170 and the lead member 120. Also, the insulating spacer 180 may prevent the electrode tabs 170 from sagging due to an own weight, and thus, the electrode tabs 170 may be smoothly welded to the lead member 120. The insulating spacer 180 blocks welding heat generated while the electrode tabs 170 are being welded and thus may reduce thermal damage of the electrode assembly 150. Referring to FIG. 3, the insulating spacer 180 is arranged between the electrode assembly 150 and a region, where the electrode tabs 170 are welded to the lead member 120, and may prevent the welding heat from directly affecting the electrode assembly 150.

Figure 4:
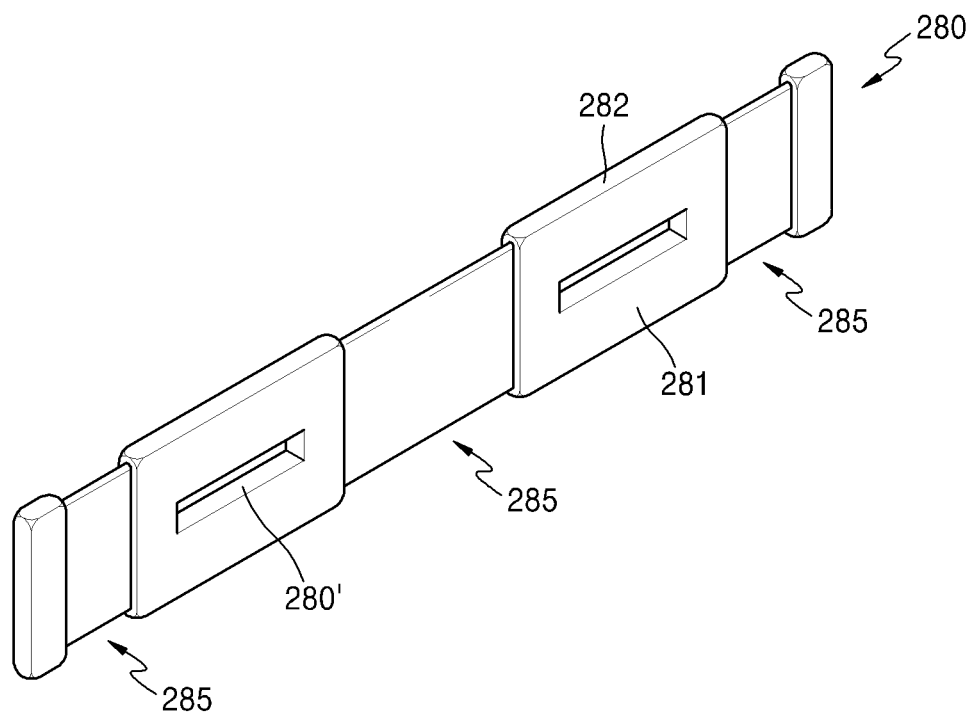
FIG. 4 is an insulating spacer that may be applied to another exemplary embodiment.
Figure 5:
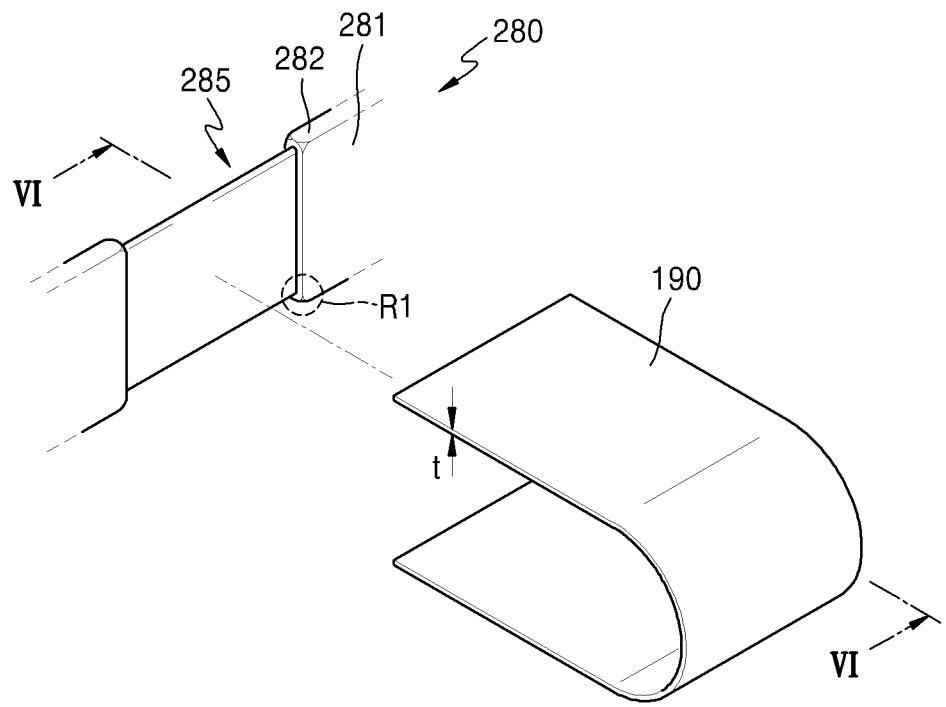
FIG. 5 is a perspective view of a portion of the insulating spacer of FIG. 4.
Figure 6:
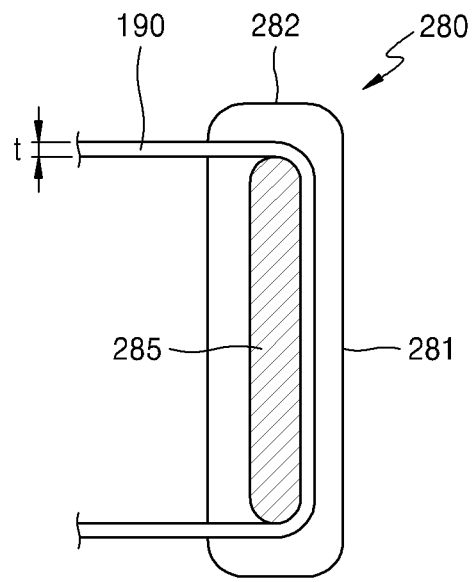
FIG. 6 is a cross-sectional view taken along a line VI-VI of FIG. 5.
Figure 7:
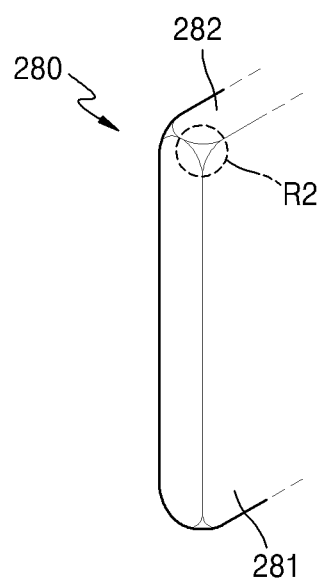
FIG. 7 is a perspective view of a portion of the insulating spacer of FIG. 4.

FIG. 4 is an insulating spacer 280 that may be applied to another exemplary embodiment. FIG. 5 is a perspective view of a portion of the insulating spacer 280 of FIG. 4. FIG. 6 is a cross-sectional view taken along a line VI-VI of FIG. 5. FIG. 7 is a perspective view of a portion of the insulating spacer 280 of FIG. 4.

Referring to drawings, the insulating spacer 280 may provide a location where the fixing member 190 is to be mounted. In this case, the insulating spacer 280 may include a mounting groove 285 formed in the location where the fixing member 190 is to be mounted. The mounting groove 285 may allow the fixing member 190 to be firmly fixed and indicates an assembly location of the fixing member 190, and thus, assembly workability of the fixing member 190 may be improved.

The mounting groove 285 offsets an increase in a thickness t of the fixing member 190 and may not allow the thickness t of the fixing member 190 to be exposed to the outside (see FIG. 6). For example, the mounting groove 285 is dented inwards by the thickness t of the fixing member 190 and thus may not allow the thickness t of the fixing member 190 to protrude from a surface of the entire insulating spacer 280. The insulating spacer 280 including the mounting groove 285 has a structure designed to minimize a thickness increase caused by adding the fixing member 190, and the structure may be advantageously used to slimming the secondary battery. In more detail, the mounting groove 285 may be formed across an upper surface 281 and side surfaces 282 of the insulating spacer 280. The mounting groove 285 may designate a mounting location of the fixing member 190, may be formed across the upper surface 281 and side surfaces 282 of the insulating spacer 280, and guide the mounting location of the fixing member 190 across the upper surface 281 and side surfaces 282 of the insulating spacer 280. Thus, the mounting groove 285 may be formed without exposing the thickness t of the fixing member 190 when the mounting groove 285 is observed at the upper surface 281 and side surfaces 282 of the insulating spacer 280.

The mounting groove 285 may include a round mounting part where the fixing member 190 contacts. The mounting part of the mounting groove 285 may be shaped as a circular arc along a trace of the fixing member 190 and may smoothly guide the fixing member 190 from an end of the electrode assembly 150 to the other end thereof. The mounting part of the mounting groove 285 may be smoothly rounded and may prevent the damage of the fixing member 190.

Referring to an R1 of FIG. 5, a wall of the insulating spacer 280 defining the mounting groove 285 may be round. As edges of the wall surrounding and defining the mounting groove 285 are round, the damage of the fixing member 190 may be prevented. For example, edges of the upper surface 281 and side surfaces 282 of the insulating spacer 280 defining the mounting groove 285 are round.

Referring to an R2 of FIG. 7, the insulating spacer 280 may include round edges in order not to have sharp edges. That is, the round edges may be formed along a border of the insulating spacer 280. Also, referring to the R1 of FIG. 5, portions of the insulating spacer 280 adjacent to the mounting groove 285, that is, edges of the upper surface 281 and side surfaces 282 of the insulating spacer 280 defining the mounting groove 285, may be round. In short, the insulating spacer 280 may have round edges in order not to have sharp edges. Since the insulating spacer 280 does not have the sharp edges, the fixing member 190 having a small thickness may not be damaged by the sharp edges of the insulating spacer 280. The reference numeral 280' of FIG. 4 denotes the tab hole in which the electrode tab 170 of the electrode assembly 150 is to be inserted.

According to at least one of the disclosed embodiments, an output of a secondary battery may be improved by restricting deformation or swelling of the secondary battery while the secondary battery operates or is being welded. Also, the secondary battery may be easily assembled due to modularity of components, and welding workability of an electrode tab may be improved. In addition, electrode tabs may be easily handled in a multi-tab structure including the electrode tabs.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:

1. A secondary battery comprising:
   an electrode assembly having a top space, a first main surface and a second main surface opposing each other;
   an electrode tab directly extending outwardly from the top surface of the electrode assembly so as to channel heat away from the electrode assembly;
   a fixing member formed adjacent to the electrode tab, the fixing member comprising a plurality of fixing members each covering at least the top surface of the electrode assembly so as to reduce a thermal deformation of the electrode assembly caused by the heat from the electrode tab;
   an insulating spacer at least a portion of which is interposed between the top surface of the electrode assembly and the fixing member, wherein the insulating spacer has a tab hole formed on an upper surface thereof into which the electrode tab is inserted, wherein the fixing members are in direct physical contact with the upper surface of the insulating spacer where the tab hole is formed, and wherein the electrode tab extends outwardly from the insulating spacer via the tab hole; and
   a lead member welded to an exposed portion of the electrode tab, wherein the insulating spacer is interposed between the electrode assembly and the exposed portion of the electrode tab to which the lead member is welded.

2. The secondary battery of claim 1, wherein the fixing member extends from the first main surface of the electrode assembly toward the second main surface of the electrode assembly across the top surface of the electrode assembly.

3. The secondary battery of claim 1, wherein the fixing member extends from the first main surface of the electrode assembly toward the second main surface of the electrode assembly across the insulating spacer.

4. The secondary battery of claim 1, wherein the insulating spacer comprises a mounting groove configured to receive a portion of the fixing member.

5. The secondary battery of claim 4, wherein the width of the mounting groove is the same as the width of the portion of the fixing member.

6. The secondary battery of claim 4, wherein the mounting groove is formed across an upper surface and side surfaces of the insulating spacer.

7. The secondary battery of claim 6, wherein walls of the upper surface and side surfaces of the insulating spacer defining the mounting groove comprise round edges, and wherein the walls are located around the mounting groove.

8. The secondary battery of claim 4, wherein the mounting groove comprises a round mounting portion contacting the fixing member.

9. The secondary battery of claim 1, wherein the insulating spacer comprises at least one round edge.

10. The secondary battery of claim 1, wherein the electrode tab comprises first and second electrode tabs having different polarities, and wherein the fixing member is arranged on an outer side of the first electrode tab, on an outer side of the second electrode tab, or between the first and second electrode tabs.

11. The secondary battery of claim 1, wherein the electrode tab comprises first and second electrode tabs having different polarities, and wherein the plurality of fixing members comprise:
   a first fixing member arranged on an outer side of the first electrode tab;
   a second fixing member arranged on an outer side of the second electrode tab; and
   a third fixing member arranged between the first and second electrode tabs.

12. The secondary battery of claim 11, wherein the first to third fixing members are arranged in parallel.

13. The secondary battery of claim 11, wherein the width of the third fixing member is greater than a combined width of the first and second fixing members.

14. The secondary battery of claim 1, wherein the fixing member comprises an adhesive tape or polyimide.

15. The secondary battery of claim 1, further comprising a case accommodating the electrode assembly, wherein the case comprises a flexible pouch.

16. The secondary battery of claim 1, wherein the electrode tab comprises a plurality of electrode tabs having the same polarity.

17. The secondary battery of claim 1, wherein each of the fixing members includes a first portion contacting the upper surface of the insulating spacer, a second portion contacting the first main surface of the electrode assembly and a third portion contacting the second main surface of the electrode assembly, and wherein each of the second and third portions is longer than the first portion.

18. The secondary battery of claim 1, wherein the electrode tab comprises first and second electrode tabs, wherein the fixing members comprise an intermediate fixing member formed between the first and second electrode tabs, and wherein the intermediate fixing member is longer than any of the remaining fixing members.

19. The secondary battery of claim 18, wherein the intermediate fixing member is wider than any of the remaining fixing members.

20. A secondary battery comprising:
   an electrode assembly having a top space, a first main surface and a second main surface opposing each other;
   an electrode tab directly outwardly extending from the top surface of the electrode assembly;
   a fixer formed adjacent to the electrode tab, the fixer comprising a plurality of fixers each covering the top, first and second main surfaces of the electrode assembly;
   an insulating spacer at least a portion of which is interposed between the top surface of the electrode assembly and the fixer, wherein the insulating spacer has a tab hole formed on an upper surface thereof into which the electrode tab is inserted, wherein the fixers are in direct physical contact with the upper surface of the insulating spacer where the tab hole is formed, and wherein the electrode tab is exposed out of the insulating spacer via the tab hole; and
   a lead member welded to an exposed portion of the electrode tab, wherein the insulating spacer is interposed between the electrode assembly and the exposed portion of the electrode tab to which the lead member is welded.

21. The secondary battery of claim 20, wherein the electrode tab comprises first and second electrode tabs having different polarities, wherein the plurality of fixers comprise first, second and third fixers, wherein the first electrode tab is positioned between the first and third fixers, and wherein the second electrode tab is positioned between the second and third fixers.

* * * * *